Patented Mar. 1, 1927.

1,619,352

UNITED STATES PATENT OFFICE.

JAMES McKEE, OF CHESTER, PENNSYLVANIA, ASSIGNOR TO SUN OIL COMPANY, OF PHILADELPHIA, PENNSYLVANIA, A CORPORATION OF NEW JERSEY.

PROCESS OF MAKING GREASE.

No Drawing.    Application filed February 27, 1925.   Serial No. 11,993.

My invention has for its object to produce an improved lime grease.

I will first describe the preferred way of carrying out the process and will then point out to what extent deviation from the preferred mode of practicing the process seems to be permissible.

75 pounds of finely ground quick lime (CaO), or, preferably, 100 pounds of calcium hydrate (Ca(OH)$_2$), are mixed with about 300 pounds of a mineral oil lubricating distillate and the mixture heated to a temperature of about 270° F. or above to expel moisture or water. To the mixture, after cooling (say) to 100° F., are added 600 pounds of double distilled red oil (oleic acid), 4,000 pounds of a mineral oil lubricating distillate, about 35 pounds of 25° Bé. caustic soda, and about one per cent by weight of water. The mixture is then heated to from 200° to 240° F., preferably with agitation in order to expel moisture, thus rendering the grease clear and translucent and also to aid and hasten those chemical reactions which take place between the oleic acid and the lime and the oleic acid and the caustic soda. It is unnecessary to maintain the mixture at a temperature of from 200° to 240° F. for any particular length of time. The mixture is then cooled to any ordinary atmospheric temperature.

As described, the percentages of the ingredients are about as follows: calcium hydrate 2%; mineral oil 86%; oleic acid 12%; caustic soda less than one per cent. These proportions, as well as the mode of practicing the process, are susceptible of certain variations.

The proportion of oleic acid may vary from 6 to 20%, in accordance with the desired density of the grease. The proportion of lime may vary from .7% to 5%. In general, the proportion of lime should vary directly with the proportions of oleic acid. Preferably the amount of lime is about one-sixth the amount of oleic acid, although it may be reduced to about one-eighth or increased to about one-fourth.

The amount of the mineral oil that may be mixed with the lime may be varied within a considerable range, but it should be a decidedly minor proportion of the entire amount of mineral oil.

It is unnecessary to add the bulk of the mineral oil before the final heating. A portion (say 2,000 pounds in the example given) may be added with the oleic acid before heating, and the remainder may be added during heating or after the temperature has been raised to within the range specified. But if any mineral oil is added at the later stage, it should be added before cooling below about 200° F., so that substantially the entire emulsion is subjected to a temperature within about the range specified.

Instead of adding oleic acid I may, less desirably, add any oil derived from vegetable or animal sources that is customarily used in the manufacture of grease; but oleic acid is distinctly preferred.

If the production of a clear product is not desired, the caustic soda need not be added. A good grease can be made without it, but its addition distinctly improves the final product, particularly so far as concerns clarification, appearance and salability. Instead of caustic soda, I may add any known alkali capable of saponifying the vegetable oil and at the same time having a clarifying action on the lime soap.

The addition of a small percentage of water is necessary to secure the desired results.

The process described has the advantage that it is capable of being carried out, from beginning to end, in a single still or other receptacle and that observation of the process as it proceeds is not an essential to its successful practice.

Where in the claims appended hereto I specify calcium hydrate, I mean to include equivalents, such as quick lime.

Having now fully described my invention, what I claim and desire to protect by Letters Patent is:

1. The process of making grease which contains a predominating proportion of mineral oil together with a lime-saponified fatty acid, which comprises forming a mixture of calcium hydrate with a minor proportion of the mineral oil, heating to expel moisture and subsequently adding a fatty acid, a small percentage of water and the remainder of the mineral oil and heating to from about 200° to 240° F.

2. The process of making grease which contains a predominating proportion of mineral oil together with a lime-saponified fatty acid, which comprises forming a mixture of calcium hydrate with a minor proportion of the mineral oil, heating to expel moisture and subsequently adding a fatty acid, a small percentage of water, an alkali capable of saponifying the fatty acid and adapted to clarify the lime soap, and the remainder of the mineral oil and heating to from about 200° to 240° F.

3. The process of making grease which contains a predominating proportion of mineral oil together with a lime-saponified fatty acid, which comprises forming a mixture of calcium hydrate with a minor proportion of the mineral oil, heating the mixture to expel moisture, cooling, and adding a fatty acid, a small percentage of water and the remainder of the mineral oil and heating to about 200° to 240° F.

4. The process of making grease which contains a predominating proportion of mineral oil together with a lime-saponified fatty acid, which comprises forming a mixture of calcium hydrate with a minor proportion of the mineral oil, heating the mixture to expel moisture, cooling, and adding a fatty acid, a small percentage of water, an alkali capable of clarifying the lime soap and the remainder of the mineral oil and heating to from 200° to 240° F.

5. The process of making grease which contains a predominating proportion of mineral oil together with a lime-saponified fatty acid, which comprises forming a mixture of calcium hydrate and a relatively small proportion of the mineral oil heating to expel moisture and subsequently adding a fatty acid, a small percentage of water and the remainder of the mineral oil and heating to about 200° to 240° F., the percentage of fatty acid added being between about 6 and 20 per cent, the percentage of lime added being from about .7 to 5 per cent, and the total percentage of mineral oil in the different stages being from about 74 to 94 per cent.

6. The process in accordance with claim 5 in which the ratio of the lime added to the fatty acid added is between 1:4 and 1:8.

7. The process in accordance with claim 5 in which is also added in the last specified step of the process a small proportion of an alkali capable of clarifying the lime soap.

8. The process of making grease which contains a predominating proportion of mineral oil together with a lime-saponified fatty acid, which comprises forming a mixture of calcium hydrate with a minor proportion of the mineral oil, heating the mixture to expel moisture, cooling, and adding a fatty acid, a small percentage of water and the remainder of the mineral oil and heating to about 200° to 240° F., the percentage of fatty acid added being between about 6 and 20 per cent, the percentage of lime added being from about .7 to 5 per cent, and the total percentage of mineral oil added in the different stages being from about 74 to 94 per cent.

9. The process in accordance with claim 8 in which the ratio of the lime added to the fatty acid added is between 1:4 and 1:8.

10. The process in accordance with claim 8 in which is also added in the last specified step of the process a small proportion of an alkali capable of clarifying the lime soap.

In testimony of which invention, I have hereunto set my hand, at Philadelphia, Pennsylvania, on this 17th day of February, 1925.

JAMES McKEE.